United States Patent [19]
Oguro et al.

[11] Patent Number: 6,081,093
[45] Date of Patent: Jun. 27, 2000

[54] SENSORLESS CONTROL METHOD AND APPARATUS OF PERMANENT MAGNET SYNCHRONOUS MOTOR

[75] Inventors: Ryuichi Oguro; Shuichi Fujii; Masanobu Inazumi, all of Fukuoka, Japan

[73] Assignee: Kabushiki Kaisha Yaskawa Denki, Fukuoka, Japan

[21] Appl. No.: 09/308,919

[22] PCT Filed: Dec. 4, 1997

[86] PCT No.: PCT/JP97/04434

§ 371 Date: Jul. 14, 1999

§ 102(e) Date: Jul. 14, 1999

[87] PCT Pub. No.: WO98/25335

PCT Pub. Date: Jun. 11, 1998

[30] Foreign Application Priority Data

Dec. 5, 1996 [JP] Japan .................................. 8-325345

[51] Int. Cl.[7] .............................. H02P 5/28; H02K 17/42
[52] U.S. Cl. .......................... 318/807; 318/809; 318/811; 318/801
[58] Field of Search .................... 318/700–839, 318/139, 245, 254, 439

[56] References Cited

U.S. PATENT DOCUMENTS

| | | | |
|---|---|---|---|
| 5,038,092 | 8/1991 | Asano et al. | 318/811 |
| 5,182,508 | 1/1993 | Schauder | 318/801 |
| 5,565,752 | 10/1996 | Jansen et al. | 318/807 |
| 5,585,709 | 12/1996 | Jansen et al. | 318/807 |
| 6,002,234 | 12/1999 | Ohm et al. | 318/729 |

*Primary Examiner*—Paul Ip
*Attorney, Agent, or Firm*—Jordan & Hamburg LLP

[57] ABSTRACT

The invention provides a sensorless control method and apparatus of a permanent magnet synchronous motor where magnetic axis can be assigned in all speed regions and speed can be controlled continuously irrespective of the speed command. In the control method, the d-q axis being the magnetic axis rotating in the real rotation speed $\omega_R$ of the motor is set and also the γ-δ axis being the assigned magnetic axis of the motor is set, and when the rotation speed $\omega_{R_\gamma}$ of the γ-δ axis is determined, a distribution gain K1 is set so as to be decreased as the absolute value of the rotation speed command $\omega_{RREF}$ becomes large and a distribution gain K2 is set so as to be increased as the absolute value of the rotation speed command $\omega_{RREF}$ becomes large, and the rotation speed command $\omega_{RREF}$ is multiplied by K1 and the speed estimated value $\omega_{RP}$ determined from the induced voltage of the synchronous motor or the induced voltage estimated value is multiplied by K2 respectively, and both multiplied values are summed thereby the rotation speed $\omega_{R_\gamma}$ of the γ-δ axis being the assigned magnetic axis is determined.

4 Claims, 3 Drawing Sheets

SENSORLESS CONTROL METHOD AND APPARATUS OF PERMANENT MAGNET SYNCHRONOUS MOTOR

FIELD OF ART

The present invention relates to a sensorless control method and apparatus of a permanent magnet synchronous motor which does not have a position detector and a speed detector.

BACKGROUND ART

When a brushless DC motor using a permanent magnet as a rotor is driven as a synchronous motor, it is necessary that the absolute position of the rotor is obtained and the correct current control is performed. In order to obtain the absolute value of the rotor, a rotor position detector such as an encoder or a resolver is generally used. However, since there are problems regarding complicateness of wiring or structure, price, use environment and the like, methods of estimating the position of the magnetic pole not using a rotor position detector have been proposed.

In the prior art, methods of estimating the position of the magnetic pole of the permanent magnet synchronous motor are known as follows.

[1] The Transaction of the Institute of Electrical Engineers of Japan, Vol. 113-D, No. 5, May 1993, p579 to 586.

[2] The Transaction of the Institute of Electrical Engineers of Japan, Vol. 114-D, No. 5, May, 1994, p591 to 592.

[3] The Transaction of the Institute of Electrical Engineers of Japan, Vol. 115-D, No. 4, April, 1995, p420 to 427.

[1] is a method that when stator currents $I_\alpha$, $I_\beta$ converted to $\alpha$-$\beta$ axis coordinate system set on the stator are made observed values and stator voltages $v_\alpha$, $v_\beta$ are made inputs, magnetic flux $\lambda_\alpha$, $\lambda_\beta$ and rotor speed are estimated using adaptive rule.

[2] is a method that when stator currents $i_\alpha$, $i_\beta$ converted to $\alpha$-$\beta$ axis coordinate system are made observed values and stator voltages $v_\alpha$, $v_\beta$ are made inputs, induced voltage $\epsilon_\alpha$ generated in the $\alpha$ axis direction in the $\alpha$-$\beta$ axis coordinate system and induced voltage $\epsilon_\beta$ generated in the $\beta$ axis direction are estimated as disturbance.

[3] is a method that deviation angle $\theta e$ between the $\gamma$-$\delta$ axis and the d-q axis is estimated from difference between stator currents $i_\gamma$, $i_\delta$ converted to the $\gamma$-$\delta$ axis coordinate system set on the stator and rotating in the synchronous speed and current calculated values $i_\gamma^0$, $i_\delta^0$ calculated from model.

However, problems in the above-mentioned conventional methods are as follows.

Regarding [1], when the method is adopted in a permanent magnet synchronous motor having polarity, on the $\alpha$-$\beta$ axis coordinates, the inductance becomes function of the rotor angle $\theta r$ of the motor and the state equation becomes complicated, and when an observer is to be constituted, the calculation amount is increased and the utilization is difficult. Also since the flux $\lambda_\alpha$, $\lambda_\beta$ is made unknown quantity, the state equation becomes non-observable at the rotor speed being zero and the estimator itself becomes unstable.

Regarding [2], since the induced voltage converted to the $\alpha$-$\beta$ axis becomes alternating quantity, if the pole of the observer is not set large, the phase difference is produced between the actual quantity and the estimated quantity and the method becomes not to be used.

[3] is a simple method in comparison with [1], [2], moreover since the $\gamma$-$\delta$ axis rotating at the angular velocity substantially synchronized with the d-q axis is considered as the reference, when the deviation $\theta e$ between the d-q axis and the $\gamma$-$\delta$ axis is small, the state equation is not complicated and the method is excellent regarding the utilization. However, since the actual value is compared with the calculated value simply introduced from the model when the $\gamma$-$\delta$ axis is coincident with the d-q axis, the deviation $\theta e$ can not be always estimated correctly due to the modeling error.

Further in the reference of [3], a method is taken in that the speed estimated value and the error between the d-axis and the $\gamma$ axis are estimated from the induced voltage or the estimated value of the induced voltage in the high speed region, and the speed control is performed while the $\gamma$ axis is coincident with the d-axis. However, this method can obtain the precision only in the region where the induced voltage is sufficiently high, and the estimation is impossible at the zero speed.

Therefore in the case of a synchronous motor of salient pole type, utilizing the property that the d-axis direction and the q-axis direction are different in inductance, if the inductance is measured while the motor is stopped, the d-axis can be known from the variation of the value of the inductance.

On the other hand, in the case of a synchronous motor of non-salient pole type, since the inductance is same in any pole, the above-mentioned method can not be used. When the synchronous motor has no load, if DC current flows in certain direction, the magnetic axis of the synchronous machine has property of moving so as to be coincident with the current flowing direction. Consequently if the current flows in the assigned magnetic axis, after lapse of sufficient time, the magnetic axis coincides with the assigned magnetic axis. As a result, the magnetic axis can be known.

However, these methods can be used only at the low speed state, and at the speed higher than certain speed, the estimation method must be changed to that described in the reference of [3]. This changing speed is different depending on sort of machines, and the rapid changing causes variation of the torque, and further different algorithms must be prepared at the low speed state basically. Therefore there is a problem that the design and the control are troublesome.

DISCLOSURE OF INVENTION

Accordingly problems to be solved by the invention are to provide a control method and apparatus where the magnetic axis can be assigned in all speed regions and the speed can be controlled continuously irrespective of the speed command.

In order to solve the above-mentioned problems, in a sensorless control method of a permanent magnet synchronous motor of the present invention, to control a region from zero speed to high speed continuously in a permanent magnet synchronous motor having a permanent magnet as a rotor, in the $\alpha$-$\beta$ space coordinate system where one phase of the stator of the synchronous motor is made $\alpha$ axis and the forward rotating direction in the electric angle 90° from the $\alpha$ axis is made $\beta$ axis, the coordinate d-q axis rotating in the real motor rotation speed $\omega_R$ is set where the magnetic axis of the motor is made d and the axis of leading in 90° from the d-axis is made q, and the $\gamma$-$\delta$ axis is set where the assigned magnetic axis of the motor is made $\gamma$ and the axis of leading in 90° from the $\gamma$ axis is made $\delta$, and when the rotation speed $\omega_{R_\gamma}$ of the $\gamma$-$\delta$ axis is determined, the distribution gain K1 set so as to be decreased as the absolute value of the rotation speed command $\omega_{RREF}$ becomes large and the distribution gain K2 set so as to be increased as the absolute value of the rotation speed command $\omega_{RREF}$ becomes large are prepared, and the rotation speed command $\omega_{RREF}$ is multiplied by K1 and the speed estimated value $\omega_{RP}$ determined from the induced voltage of the synchronous motor or the induced voltage estimated value is multiplied by K2 respectively, and both multiplied values are summed thereby the rotation speed $\omega_{R_\gamma}$ of the δ-δ axis of the assigned magnetic axis is determined.

Further when the γ axis current command value $i_\gamma^{REF}$ is to be determined, the low speed region command value $i_\gamma^{REFL}$ is multiplied by the distribution gain K1 and the normal speed region command value $i_\gamma^{REFH}$ is multiplied by the distribution gain K2 respectively, and both multiplied values are summed thereby the γ axis current command value $i_\gamma^{REF}$ can be determined, and also the δ axis current command value $i_\delta^{REF}$ can be constituted by the proportion control term comprising the speed command values $\omega_{REF}$ and $\omega_{RP}$ and the integral control term comprising the speed command values $\omega_{RREF}$ and $\omega_{R_\gamma}$.

Also a sensorless control apparatus of a permanent magnet synchronous motor of the present invention is provided with a distribution gain generator setting a distribution gain K1 to be decreased as the absolute value of a rotation speed command $\omega_{RREF}$ becomes large and a distribution gain K2 to be increased as the absolute value of a rotation speed command $\omega_{RREF}$ becomes large, γ axis current command generator generating command $i_\gamma^{REF}$ based on γ axis current command $i_\gamma^{REFL}$ at low speed state, γ axis current command $i_\gamma^{REFH}$ at high speed state and the distribution gains K1, K2, a speed controller outputting δ axis current $i_\delta^{REF}$ based on rotation speed command $\omega_{RREF}$, δ axis current controller outputting axis voltage command $v_\gamma^{REF}$ based on the δ axis current $i_\delta^{REF}$, γ axis current controller outputting γ axis voltage command $v_\gamma^{REF}$ based on the γ axis current command $i_\gamma^{REF}$, a vector control circuit outputting amount of voltage and position angle to an inverter circuit of the synchronous motor based on the δ axis voltage command $V_\delta^{REF}$ and the δ axis voltage command $V_\gamma^{REF}$, a three phases/two phases converter generating δ axis current $i_\delta$ and γ axis current $i_\gamma$ based on currents $i_u$, $i_w$ of two phases of the synchronous motor, γ-δ axis, current, induced voltage estimator outputting induced voltage estimated values $\epsilon_\delta^{est}(k+1)$ and $\epsilon\gamma^{est}(k+1)$ based on the voltage commands $v_\delta^{REF}$, $v_\gamma^{REF}$, the δ axis current $i_\delta$ and the γ axis current $i_\gamma$ and also outputting γ axis current estimated value $i_\gamma^{est}(k+1)$ to the γ axis current controller and δ axis current estimated value $i_\delta^{est}(k+1)$ to the δ axis current controller respectively, a proportion control speed operator operating command control speed $\omega_{RPest}$ based on the induced voltage estimated values $\epsilon_\delta^{est}(k+1)$, $\epsilon_\gamma^{est}(k+1)$, an integral magnetic axis rotating speed operator outputting the rotating speed $\omega_{R\gamma est}$ of the magnetic axis based on the distribution gains K1, K2 and the command control speed $\omega_{RPest}$, and a magnetic axis operator inputting amount of voltage and position angle to the inverter circuit based on the rotating speed $\omega_{R_\gamma est}$ of the magnetic axis.

According to the present invention, following effects are obtained.

(1) In the low speed region where the ratio of K1 is designed larger than that of K2, since the rotation speed $\omega_{R_\gamma}$ of the γ axis is near the speed command value $\omega_{RREF}$, the d-axis being the real magnetic axis is rotated at the same speed as that of the γ axis in the mean value and at the speed substantially equal to the speed command value. On the other hand, in the high speed region, since the ratio of K2 is designed sufficiently larger than that of K1 and also $\omega_{RP}$ and $\omega_{R_\gamma}$ are coincident, the proportion control term and the speed estimated value constituting the integral control term are coincident. As a result, the vector control is executed well.

(2) Since the distribution gain is set continuously, at the intermediate speed region between the low speed region and the high speed region, the error between the γ axis and the d-axis is gradually corrected and the region from the low speed region to the high speed region is executed continuously by the same algorithm.

(3) When the δ axis current command value $i_\delta^{REF}$ is constituted by the proportion control term comprising the speed command values $\omega_{REF}$ and $\omega_{RP}$ and the integral control term comprising the speed command values $\omega_{RREF}$ and $\omega_{R_\gamma}$, the speed estimated value is fed back to the proportion command term comprising $\omega_{RP}$ and the transient oscillation of the d-axis is suppressed.

BEST MODE FOR CARRYING OUT THE INVENTION

Figure 1:
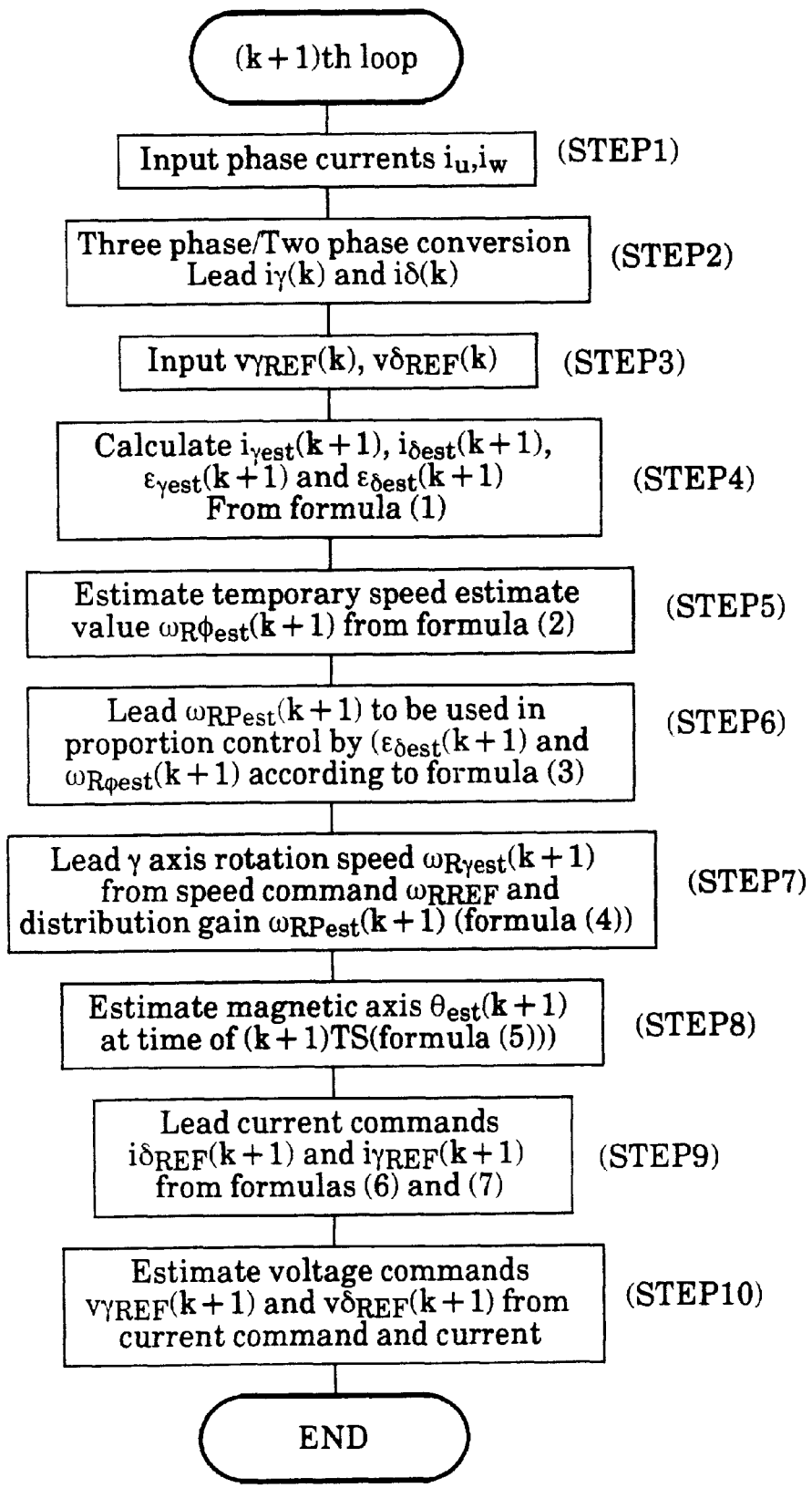
FIG. 1 is a flow chart showing steps of the invention.

Embodiments of the present invention will be described according to a flow chart in FIG. 1.

Figure 3:
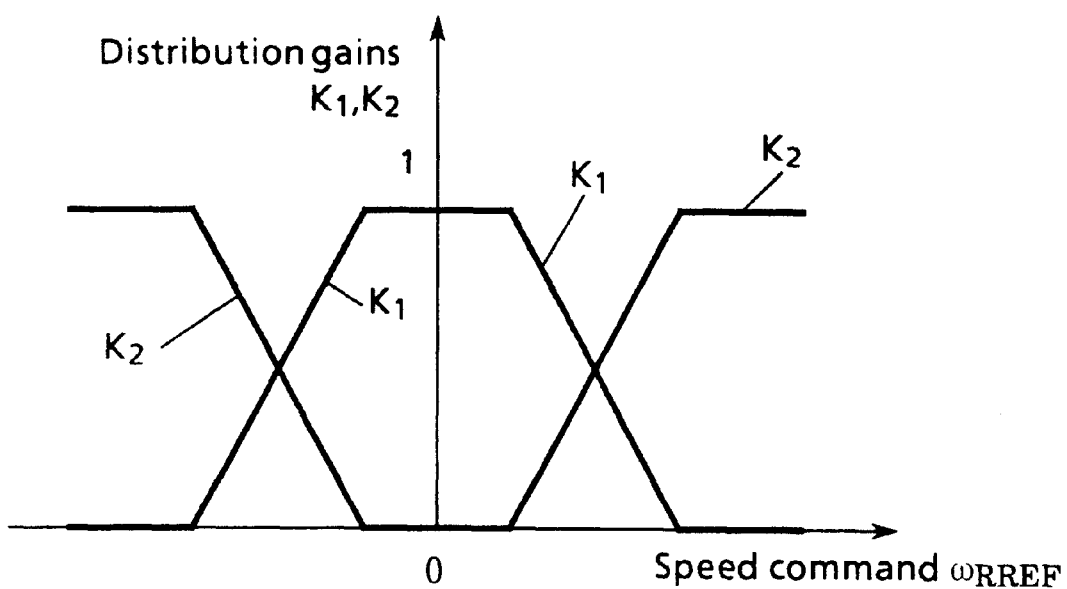
FIG. 3 is an explanation diagram showing relation of distribution gains K1, K2 according to the invention.

Distribution gains K1, K2 (K1+K2=1) are function of speed command $\omega_{RREF}$, and as shown in FIG. 3, setting is performed so that K1 becomes gain 0 at high speed, and varies linearly at the intermediate region between the low speed and the high speed.

Currents $i_u$, $i_w$ of the U phase and the W phase are inputted from a current sensor (step 1).

Magnetic axis position $\theta_{est}(k)$ of the γ axis assigned at the previous operation loop is used, and the three phases/two phases conversion is executed and the actual current values $i_\gamma(k)$, $i_\delta(k)$ in the γ-δ coordinate system are led (step 2).

Voltage commands $v_\delta^{REF}(k)$, $v_\delta^{REF}(k)$ converted to the γ-δ coordinate system and outputted at the time of (k+1) seconds are inputted (step 3).

According to formula (1), γ-δ axis current estimated values $i_\gamma^{est}(k+1)$, $i_\delta^{est}(k+1)$ and induced voltage estimated values $\epsilon_\gamma^{est}(k+1)$, $\epsilon_\delta^{est}(k+1)$ at the time of (k+1) Ts seconds are estimated (step 4).

$$\begin{pmatrix} i_{\gamma est}(k+1) \\ i_{\delta est}(k+1) \\ \varepsilon_{\gamma est}(k+1) \\ \varepsilon_{\delta est}(k+1) \end{pmatrix} = \begin{pmatrix} 1-(R_s/L_d)T_s & (L_q/L_d)\omega R\gamma \cdot T_s & T_s & 0 \\ -(L_d/L_q)\omega R\gamma \cdot T_s & 1-(R_s/L_q)T_s & 0 & T_s \\ 0 & 0 & T_s/L_q & 0 \\ 0 & 0 & 0 & -T_s/L_q \end{pmatrix} \begin{pmatrix} i_{\gamma est}(k) \\ i_{\delta est}(k) \\ \varepsilon_{\gamma est}(k) \\ \varepsilon_{\delta est}(k) \end{pmatrix} + \quad (1)$$

$$\frac{T_s}{L_q} \begin{pmatrix} 1 & 0 \\ 0 & 1 \\ 0 & 0 \\ 0 & 0 \end{pmatrix} \begin{pmatrix} v_{\gamma REF}(k) \\ v_{\delta REF}(k) \end{pmatrix} + \begin{pmatrix} K_1 & K_2 \\ K_3 & K_4 \\ K_5 & K_6 \\ K_7 & K_8 \end{pmatrix} \begin{pmatrix} i_\gamma(k) - i_{\gamma est}(k) \\ i_\delta(k) - i_{\delta est}(k) \end{pmatrix}$$

Where Rs: stator resistance, Lq: q-axis inductance, Ld: d-axis inductance, Ts: sampling time, $K_1$ to $K_8$: observer feedback gain.

As known well, since $\varepsilon_{\delta est}(k+1)=K\varepsilon \cdot \omega_R \cdot \sin\theta e$, $\varepsilon_{\delta est}(k+1) = K\varepsilon \cdot \omega_R \cdot \cos\theta e$, according to formula (2), temporary speed estimated value $\omega_R \phi_{est}(k+1)$ is estimated (step 5).

$$\omega R_{\phi est}(k+1) = \text{sign}\left(\varepsilon_{\delta est}(k+1) \cdot (1+K_\phi)\sqrt{\varepsilon_{\delta est}^2(k+1)+\varepsilon_{\gamma est}^2(k+1)}\right) \quad (2)$$

$K_\Theta$: induced voltage constant (2)

From sign of the induced voltage of the δaxis and the induced voltage of the γ axis, according to formula (3), $\omega_{RP}(k+1)$ to be used in the proportion control is led (step 6).

$$\omega_{RPest}(k+1)=\omega_{R\phi est}(k+1)+K_\Theta \cdot \text{sign}(\omega_{R\phi est}(k+1))\cdot \varepsilon_\gamma{}^{est}(k+1) \quad K_\Theta: \text{gain}(3)$$

According to the speed command value, using the distribution gain assigned as shown in FIG. 3, according to formula (4), the rotation speed of the γ axis is assigned and the speed estimated value $\omega_R{}^{\gamma est}(k+1)$ to be used in the integral control is led (step 7).

$$\omega_{R_\gamma est}(k+1)=K_1\omega_{RREF}+K_2\omega_{RP}(k+1) \quad (4)$$

From these speed estimated values, based on formula (5), position $\theta_{est}(k+1)$ of the γ axis at the time of (k+1) Ts seconds is assigned (step 8).

$$\theta_{est}(k+1)=\theta_{est}(k)+\theta_{R_\gamma}(k+1)\cdot Ts \quad (5)$$

Using the speed and the speed command estimated in step 7, according to formula (6), current command $i_\delta{}^{REF}(k+1)$ of the γ-δ axis is led. According to formula (7), current command $i_\gamma{}^{REF}$ of the T axis is led (step 9).

$$i_{\delta REF}(k+1) = \quad (6)$$
$$K_V(\omega_{RREF}-\omega_{RPest}(k+1))+K_I K_V T_S \sum_{i=0}^{k+1}(\omega_{RREF}-\omega_{RPest}(k+1))$$

$$i_\gamma{}^{REF}(k+1)=K_1 i_\gamma{}^{REFL}+K_2 i_\gamma{}^{REFH} \quad (7)$$

From the current command and the current, voltage commands $v_\gamma{}^{REF}(k+1)$, $v_\delta{}^{REF}(k+1)$ to be outputted at the time of (k+1) Ts seconds are estimated (step 10).

In the present invention, if the DC current $i_\delta{}^{REFL}$ in the forward direction is generated to the γ axis being arbitrary assigned axis, when the d-axis being the real magnetic axis exists in the phase delayed by the load angle θe from the γ axis, torque being proportional to $i_\gamma{}^{REFL}\sin\theta e$ and directed to the γ axis direction is generated in the magnetic axis. Therefore if the load torque is zero, the real magnetic axis is always subjected to the torque directed to the γ axis being the assigned magnetic axis. In a synchronous machine usually having no damper winding, since the damping factor is substantially zero, the d-axis produces simple harmonic oscillation around the γ axis. In the present invention, the speed estimated value is fed back to the proportional control term comprising $\omega_{RP}$ thereby the transient oscillation of the d-axis is suppressed. The speed used for the integral is coincident with the assigned speed of the γ axis, and in the low speed region where the ratio of K1 is designed larger than that of K2, since the rotation speed $\omega_{R_\gamma}$ of the γ axis is near the speed command value $\omega_{RREF}$, the d-axis being the real magnetic axis is rotated at the same speed as that of the γ axis in the mean value and at the speed substantially equal to the speed command value.

On the other hand, in the high speed region, since the induced voltage has sufficient value, the rotation speed $\omega_{R_\gamma}$ of the γ axis is coincident with the rotation speed of the d-axis in the mean value and the setting so as to correct the angle error between the γ axis and the d-axis becomes possible. In the high speed region, since the ratio of K2 is designed sufficiently larger than that of K1 and $\omega_{RP}$ and $\omega_{R_\gamma}$ are coincident, the proportional control is coincident with the speed estimated value constituting the integral control term. As a result, the γ axis is coincident with the d-axis moreover the speed command is coincident with the speed. In the sensorless vector control, the γ axis is deemed as the magnetic axis but is coincident with the d-axis, thereby the vector control is executed well.

Moreover in the present invention, since the distribution gain is set continuously, in the intermediate region between the low speed region and the high speed region, the error between the γ axis and the d-axis is corrected gradually and the region from the low speed region to the high speed region is executed continuously in the same algorithm.

Figure 2:
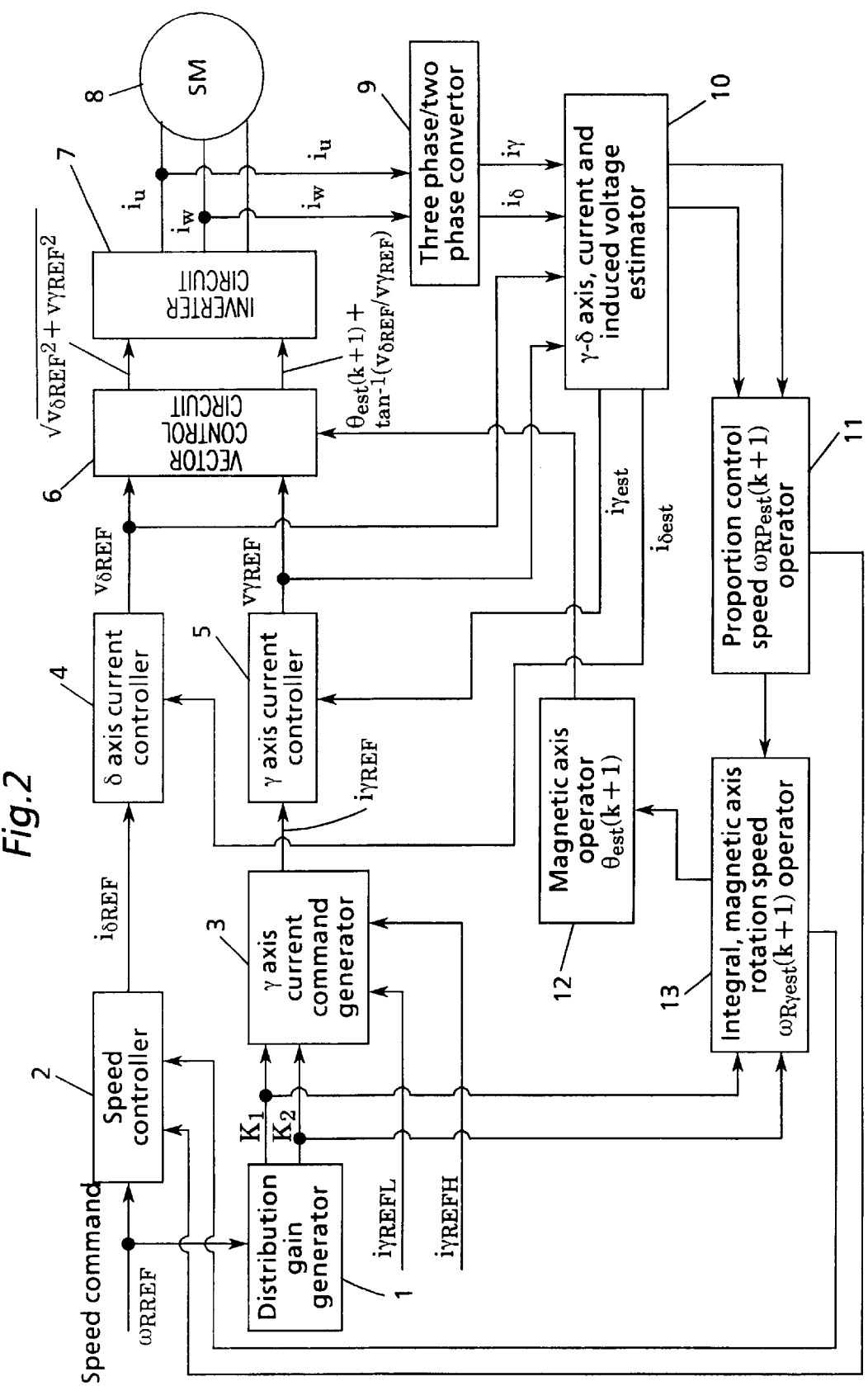
FIG. 2 is a block diagram of control system executing the invention.

FIG. 2 is a block diagram of the present invention. In FIG. 2, numeral 1 designates a distribution gain generator, numeral 2 designates a speed controller, numeral 3 designates γ axis current command generator, numeral 4 designates δ axis current controller, numeral 5 designates γ axis current controller, numeral 6 designates a vector control circuit, numeral 7 designates an inverter circuit, numeral 8 designates a synchronous motor, numeral 9 designates a three phases/two phases converter, numeral 10 designates γ-δ axis, current, induced voltage estimator, numeral 11 designates a proportion control speed operator, numeral 12 designates a magnetic axis operator and numeral 13 designates an integral, magnetic axis rotation speed operator.

In FIG. 2, by the speed command $\omega_{RREF}$, the distribution gain generator 1 produces distribution gains K1, K2 in FIG. 3. The γ axis command $i_\gamma{}^{REF}$ is produced in that the $i_\gamma{}^{REFL}$: low speed command, the $i_\gamma^{REFH}$: high speed command and K1, K2 are inputted to the γ axis current command generator 3. The speed controller 2 outputs the δ axis current $i_{67}{}^{REF}(k+1)$, and the δ, γ axes voltage commands $v_\delta^{REF}$, $v_\gamma^{REF}$ are outputted from the δ axis current controller 4 and the γ axis current controller 5 and are inputted to the vector control circuit 6. The output $\theta_{est}(k+1)$ from the magnetic axis operator 12 is inputted to the vector control circuit 6, and the amount of voltage and the position angle are inputted to the inverter circuit 7. The inverter circuit 7 supplies a current to the synchronous motor 8. Currents $i_u$, $i_w$ are inputted to the three phases/two phases converter 9, and the rotor coordinate system γ-δ axis current is produced. This current is inputted to the γ-δ axis, current, induced voltage estimator 10, and also the voltage commands $v_\delta^{REF}$, $v_\gamma^{REF}$ are inputted. By the γ-δ axis, current, induced voltage estimator 10, the induced voltage estimated values $\epsilon_\delta^{est}(k+1)$, $\epsilon_\gamma^{est}(k+1)$ are inputted to the proportion control speed operator 11 and the command control speed $\omega_{RPest}$ is outputted. On the other hand, $i_\gamma^{est}(k+1)$, $i_\delta^{est}(k+1)$ are inputted to the δ axis current controller 4 and the γ axis current controller 5, and the voltage command is produced. The $\omega_{RPest}$ and $\omega_{RREF}$, and the distribution gains K1, K2 are inputted to the magnetic axis rotation speed operator 13, and the rotation speed $\omega_{R_\gamma est}$ of the magnetic axis is outputted.

INDUSTRIAL APPLICABILITY

The present invention can be utilized in the field of sensorless speed control of a permanent magnet synchronous motor.

What is claimed is:

1. A sensorless control method of a permanent magnet synchronous motor wherein a permanent magnet synchronous motor having a permanent magnet as a rotor is controlled in a region from zero speed to high speed continuously, characterized in that in the α-β space coordinate system where one phase is made α axis and the forward rotating direction in the electric angle 90° from the α axis is made β axis, the coordinate d-q axis rotating in the real motor rotation speed $\omega_R$ is set where the magnetic axis of the motor is made d and the axis of leading in 90° from the d-axis is made q, and the γ-δ axis is set where the assigned magnetic axis of the motor is made γ and the axis leading in 90° from the γ axis is made δ, and that when the rotation speed $\omega_{R_\gamma}$ of the γ-δ axis is determined, the distribution gain K1 is set so as to be decreased as the absolute value of the rotation speed command $\omega_{RREF}$ becomes large and the distribution gain K2 is set so as to be increased as the absolute value of the rotation speed command $\omega_{RREF}$ becomes large, and the rotation speed command $\omega_{RREF}$ is multiplied by K1 and the speed estimated value $\omega_{RP}$ determined from the induced voltage of the synchronous motor or the induced voltage estimated value is multiplied by K2 respectively, and both multiplied values are summed thereby the rotation speed $\omega_{R_\gamma}$ of the γ-δ axis of the assigned magnetic axis is determined.

2. A sensorless control method of a permanent magnet synchronous motor as set forth in claim 1, wherein when the γ axis current command value $i_{REFL}$ is multiplied by the gain K1 and the normal speed region command value $i_\gamma^{REFH}$ is multiplied by the distribution gain K2 respectively, and both multiplied values are summed thereby the γ axis current command value $i_\gamma^{REF}$ is determined.

3. A sensorless control method of a permanent magnet synchronous motor as set forth in claim 1, wherein the δ axis current command value $i_\gamma^{REF}$ is constituted by the proportion control term comprising the speed command values $\omega_{REF}$ and $\omega_{RP}$ and the integral control term comprising the speed command values $\omega_{RREF}$ and $\omega_{R_\gamma}$.

4. A sensorless control apparatus of a permanent magnet synchronous machine, comprising:

a distribution gain generator setting a distribution gain K1 to be decreased as the absolute value of a rotation speed command $\omega_{RREF}$ becomes large and a distribution gain K2 to be increased as the absolute value of a rotation speed command $\omega_{RREF}$ becomes large;

γ axis current command generator generating the γ axis command $i_\gamma^{REF}$ based on the γ axis current command $i_\gamma^{REFL}$ at low speed state, the γ axis current command $i_\gamma^{REFH}$ at high speed state and the distribution gains K1, K2;

a speed controller outputting the δ axis current $i_\delta^{REF}$ based on the rotation speed command $\omega_{RREF}$;

δ axis current controller outputting the δ axis voltage command $v_\delta^{REF}$ based on the δ axis current $i_\gamma^{REF}$;

γ axis current controller outputting the γ axis current command $v_\gamma^{REF}$ based on the γ axis current command $i_\gamma^{REF}$;

a vector control circuit outputting amount of voltage and position angle to an inverter circuit of the synchronous motor based on the δ axis voltage command $V_\delta^{REF}$ and the γ axis voltage command $v_\gamma^{REF}$;

a three phases/two phases converter generating the δ axis current $i_\delta$ and the γ axis current iγ based on currents $i_u$, $i_w$ of two phases of the synchronous motor;

γ-δ axis, current, induced voltage estimator outputting the induced voltage estimated values $\epsilon_\delta^{est}(k+1)$ and $\epsilon_\gamma^{est}(k+1)$ based on the voltage commands $v_\delta^{REF}$, $v_\gamma^{REF}$, the δ axis current $i_\delta$ and the γ axis current $i_\gamma$ and also outputting the γ axis current estimated value $i_\gamma^{est}(k+1)$ to the γ axis current controller and the δ axis current estimated value $i_{67}{}^{est}(k+1)$ to the δ axis current controller respectively;

a proportion control speed operator operating the command control speed $\omega_{RPest}$ based on the induced voltage estimated values $\epsilon_\delta^{est}(k+1)$, $\epsilon_\gamma^{est}(k+1)$;

an integral magnetic axis rotation speed operator outputting the rotation speed $\omega_{R_\gamma est}$ of the magnetic axis based on the distribution gains K1, K2 and the command control speed $\omega_{RPest}$; and a magnetic axis operator inputting amount of voltage and position angle to the inverter circuit based on the rotation speed $\omega_{R_\gamma est}$ of the magnetic axis.

* * * * *